April 26, 1949.  A. L. BRAUCH  2,468,424
HAY BUCK AND STACKER

Filed April 11, 1946  4 Sheets-Sheet 1

Inventor:
Albert L. Brauch.
By Bair + Freeman
Attorneys

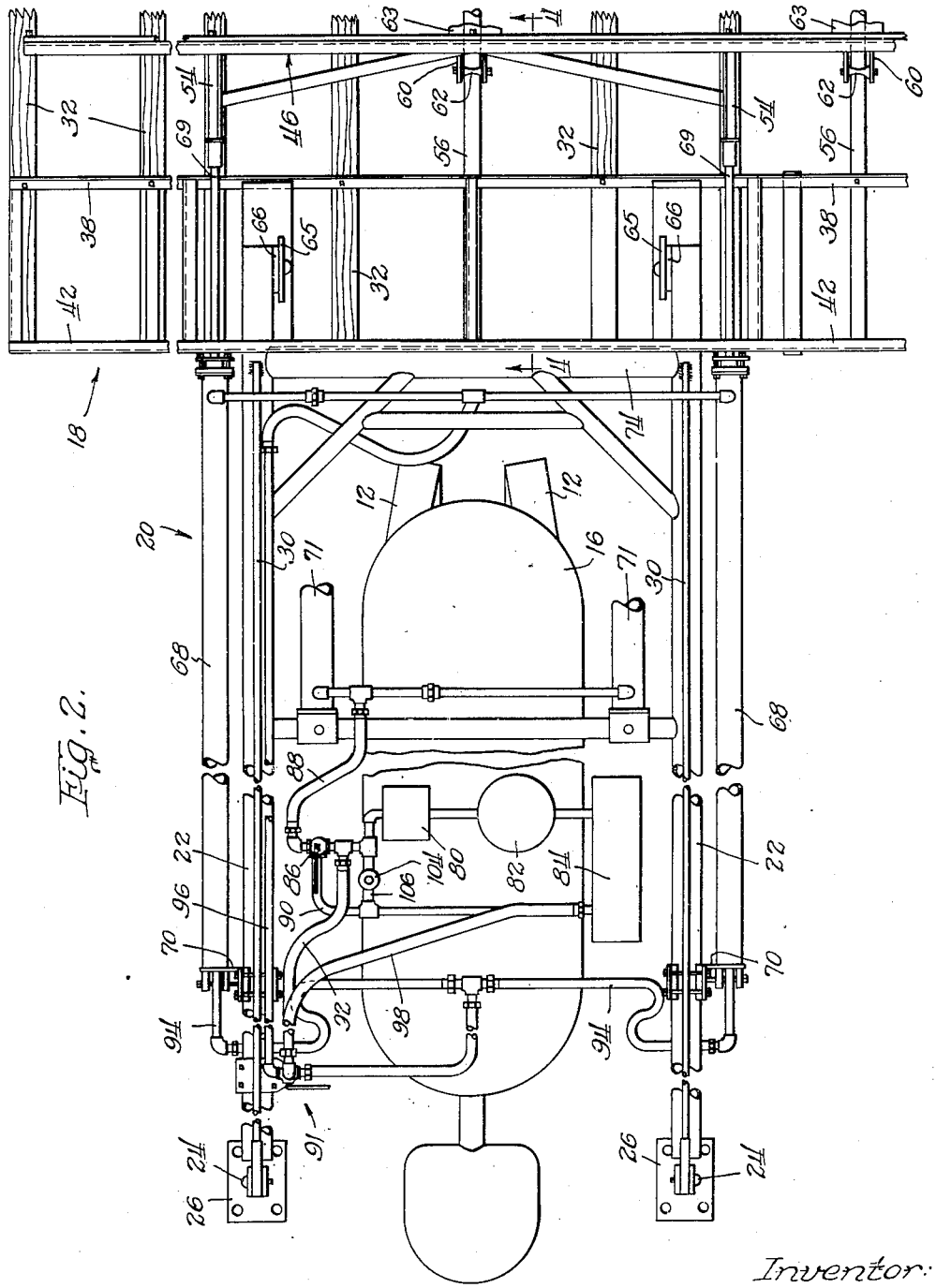

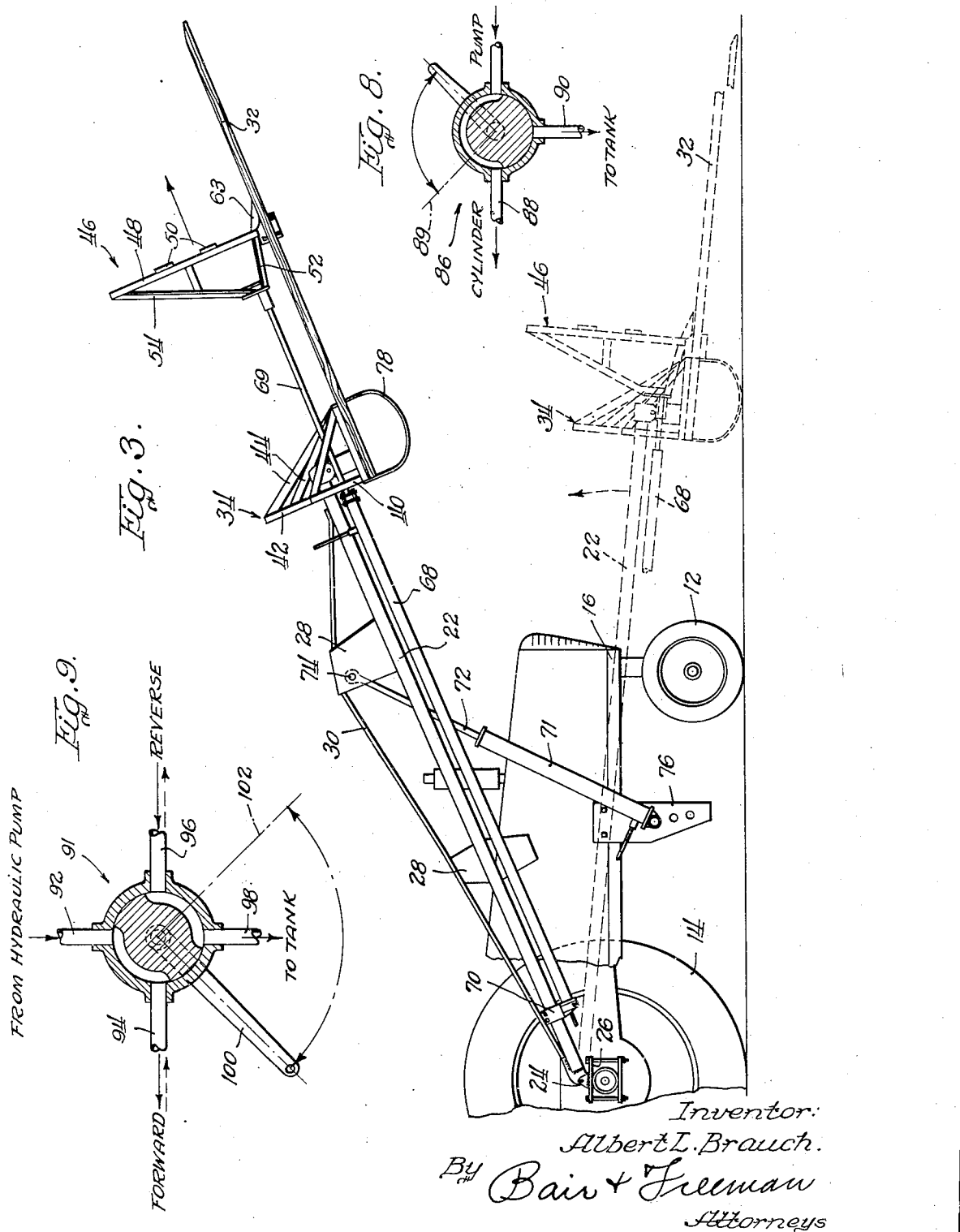

April 26, 1949.  A. L. BRAUCH  2,468,424
HAY BUCK AND STACKER
Filed April 11, 1946  4 Sheets-Sheet 4
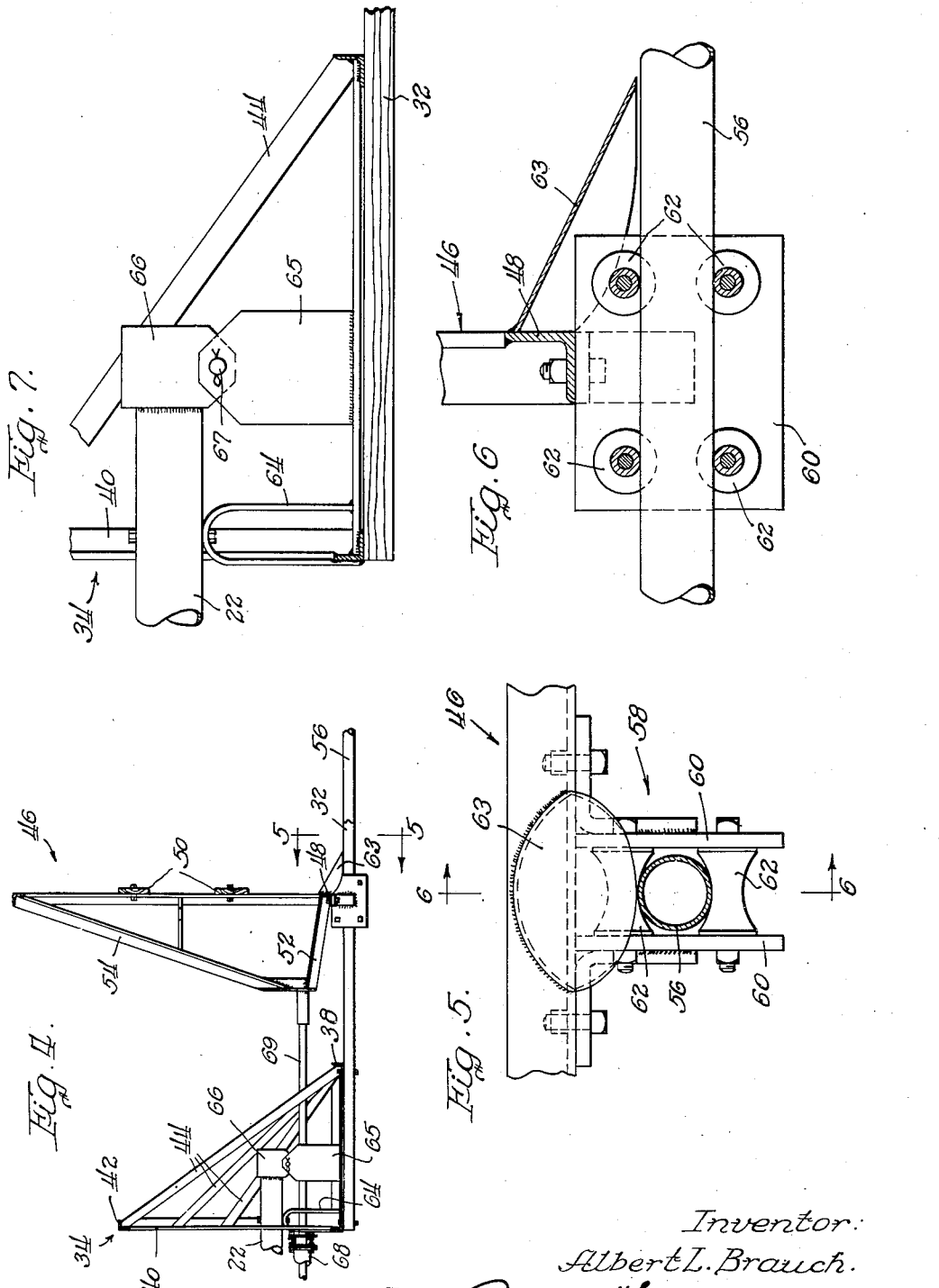
Inventor:
Albert L. Brauch.
By Bair & Freeman
Attorneys.

Patented Apr. 26, 1949

2,468,424

UNITED STATES PATENT OFFICE 2,468,424

HAY BUCK AND STACKER

Albert L. Brauch, Omaha, Nebr., assignor to Harry A. Smith and Ben E. Kaslow, both of Omaha, Nebr.

Application April 11, 1946, Serial No. 661,258

6 Claims. (Cl. 214—131)

This invention relates to hay bucks and stackers.

Particularly the device is an attachment to be applied to a tractor, being entirely portable, and is designed for picking up hay from the ground and raising it for stacking, or loading in a vehicle.

The device is applicable for picking up loose hay, as in a field, and unloading it into a hayrack, and for picking up bales and stacking them. Devices designed for the former purpose, i. e., picking up loose hay, are sometimes referred to as sweeps.

An object of the invention is the provision of a stacker which is power operated in both loading and unloading operations, the power being derived from the tractor.

Another object is to provide a device as described above which is operated by hydraulic power.

A further object is the provision of a hay buck and stacker having a great capacity and range of elevation.

Specifically, the device consists of a flat rack, having forwardly extending teeth upon which the hay rests, and an ejector for forcing the hay off the rack in its elevated position. The ejector is retractable to the rear of the rack so as to leave the whole of the rack free for hay, and extendible to the extreme front end for completely ejecting the hay from the rack.

Elevation of the rack and operation of the ejector are both accomplished by hydraulic power from the tractor, being operable selectively. The hydraulic rams for elevating the rack need be only single acting, since the rack lowers under its own weight; but the rams for the ejector are double acting, for both extending and retracting it.

Another object of the invention is the provision of a rack which is light in weight and simple of construction.

Still another object is the provision of strengthening members in the construction of the rack at crucial points for imparting a rugged aspect to the rack without materially detracting from its generally light weight.

A still further object resides in the fact that certain of the teeth of the rack are made of tubular steel members for forming tracks upon which the ejector is mounted and is adapted to slide in its forward and backward movements.

Another object of the invention is the provisoin of skids mounted on the rack which contact the ground and upon which the rack rests when fully lowered. The rack can then ride along the ground, and this relieves the operator of having to use extreme accuracy in positioning the rack so that it is properly spaced from the ground. The skids are so constructed, with relation to the point of securement of the rack on the tractor, that when the rack is lowered and the skids are on the ground, the front end of the rack is properly spaced from the ground.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 2 is a plan view of the device applied to a tractor, with portions of the rack omitted;

Figure 3 is a side elevational view of the device in elevated position, and showing its lowermost position in dotted lines;

Figure 4 is a fragmentary sectional view taken on line 4—4 of Figure 2;

Figure 5 is an enlarged view taken on line 5—5 of Figure 4;

Figure 6 is a view taken on line 6—6 of Figure 5;

Figure 7 is an enlarged fragmentary view showing the means for securing the rack to its supporting booms;

Figure 8 shows a valve for the hydraulic system for elevating the stacker; and

Figure 9 shows a four-way valve for the hydraulic system for operating the ejector of the rack.

Figure 1:
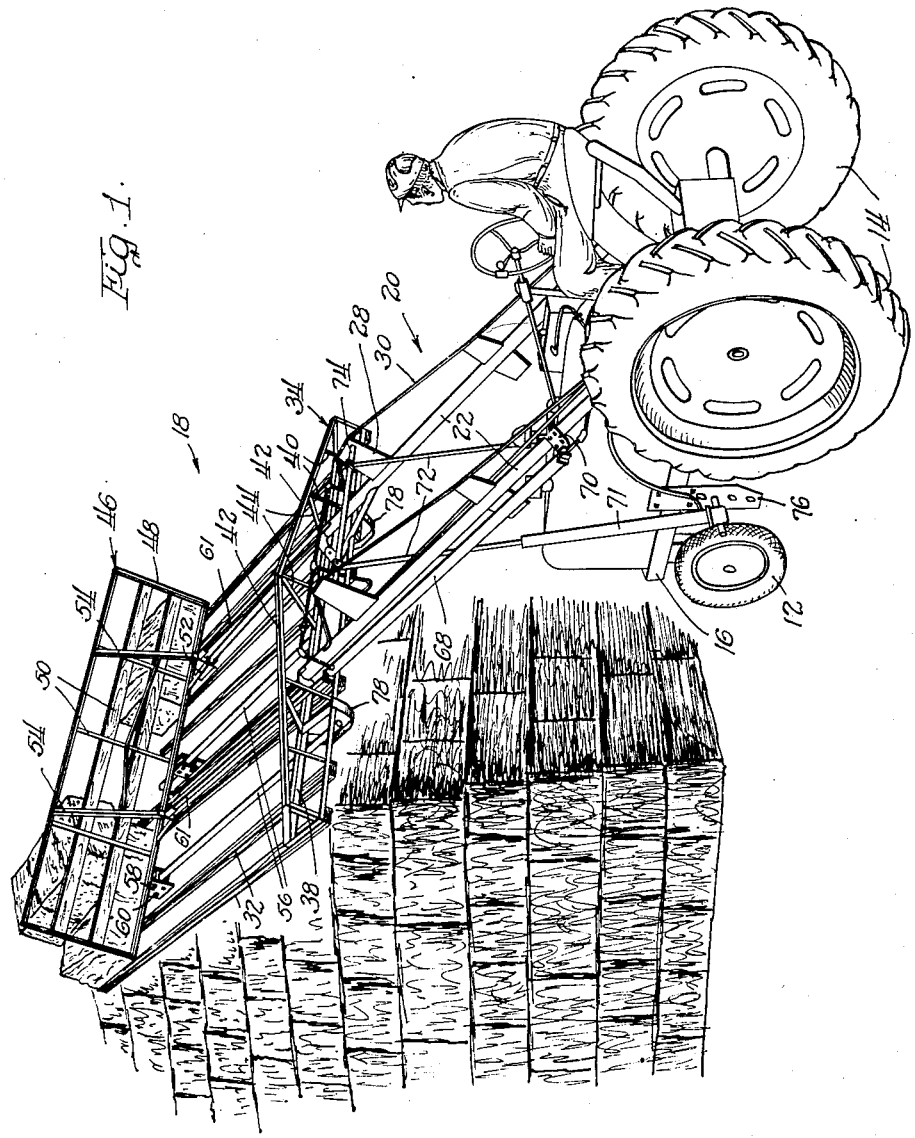
Figure 1 is a perspective view of the device applied to a tractor and showing the hay buck and stacker in elevated position.

Referring in detail to the drawings I have shown the device applied to a tractor. The tractor may be of any of the various types of farm tractors, and includes front wheels 12, rear wheels 14 and a frame 16. The hay buck and stacker is shown as a whole by the numeral 18, and is supported and operated by a framework and mechanism indicated generally at 20.

The framework 20 includes two booms 22 disposed in parallel relation with one on each side of the tractor frame. These booms may be of any desired formation, but a convenient construction consists of ordinary tubular pipe. The rear ends of the booms 22 are pivoted at 24 on brackets 26, which are secured to the tractor frame toward the rear thereof. The booms 22 are reinforced by means of plates 28 welded thereto, and rods 30 welded over the tops of the plates 28 and to the main part of the booms.

The stacker 18 is rigidly secured to the forward ends of the booms 22. The stacker 18 includes a plurality of teeth 32 which are disposed in substantially parallel relation and lie in a common plane. The stacker 18 also includes an end frame 34 formed as a part of the rack, and providing the means for securing the teeth 32 in proper position, and in effect, forming a unitary device therewith. Referring to the rack as a whole, the end member 34 is disposed at the rear end of the rack and in substantially perpendicular relation thereto, and at the forward end thereof the teeth are unobstructed and open. It is by means of the end frame construction 34 that the rack is secured to the booms 22.

The end frame 34 is a reinforcing structure including an angle member 36 formed of ordinary angle iron and positioned at the extreme rear ends of the teeth 32. Another angle iron 38 forming a part of the end frame 34 is disposed forwardly along the teeth from the angle member 36 and secured to the teeth 32 at that point, the two members 36 and 38 serving to retain the teeth and the rack as a whole in proper relation. Upright members 40 are provided at spaced intervals transversely along the angle 36, and secured at the upper ends of the members 40 are two additional members 42. The length of the various members 40 are such that the members 42 form an inverted V for the purpose of added strength. Diagonal braces 44 interconnect the members 42 and 38 to retain the end frame 34 in proper relation with the teeth 32, and strengthen the rack as a whole.

A push-off rack, or ejector, 46 is provided on the stacker and is in the form of a plane framework having peripheral angle irons 48, and inner horizontal and vertical spaced members 50. On the rear side of the ejector 46 are rearwardly extending brackets 52 and diagonal braces 54 connecting the outer ends of the brackets 52 and the upper edge of the ejector 46. It is by means of these brackets that the ejector is operated on the rack as will be explained later.

For the purpose of providing a track and guiding means for the ejector 46, certain of the teeth 32 are made of tubular steel such as ordinary steel piping. These particular teeth are indicated at 56 and are interspersed among the other teeth at spaced intervals in the particular structure. There are three of these teeth. Cooperating with the teeth 56 are roller carriages 58 secured to the lower edge of the ejector 46, each of which comprises a bracket 60, in which are mounted rollers 62 so disposed therein as to have two rollers engaging the upper surface, and two engaging the under surface of the iron teeth 56. The ejector 46 slides along on these iron teeth and furnishes a means of easy operation of the ejector. These teeth also serve the purpose of strengthening the rack, the remaining teeth being preferably wooden in order to lighten the rack.

A plurality of shields 63 are secured to the lower edge of the ejector 46, one associated with each roller carriage 58. The shields 63 are spade-shaped devices, and are welded to the lower edge of the ejector, extending slightly downwardly and forwardly toward the open ends of the teeth 56. When the ejector is slid along the rack, the shields 63 clear the teeth 56 of foreign matter which might otherwise interfere with proper operation of the rollers 62. The leading edges of the shields 63 are spaced from the teeth 56 a convenient distance.

The rack 18 is secured to the booms 22 by means of inverted U-shaped brackets 64 and plates 65 which are welded to elements of the end frame 34. Bolts pass through the brackets 64 and the shanks of the booms 22, and on the front ends of the booms are welded securing elements 66 which, in turn, are secured to the plates 65 by pins 67. This arrangement furnishes a two-point support on each boom 22 for the rack whereby the rack is held rigid on the booms.

The ejector 46 is operated by hydraulic rams 68 and cooperating pistons 69, which are secured to the rear end of the brackets 52. The hydraulic rams 68 are rigidly secured to the booms 22 by means of brackets 70 at the rear ends of the cylinders, the forward ends being free to prevent binding of the pistons 69 therein, if the rack 18 should be flexed slightly out of alignment due to heavy loads. The general effect, though, is that the rams 68 move with the booms 22 and may be considered rigid therewith.

The stacker is elevated and lowered by means of hydraulic rams 71, from which pistons 72 extend and are connected to a cross arm 74 welded to the forward plates 28. The upper ends of the pistons 72 are pivoted on the cross arm 74, and the lower ends of the rams 71 are pivoted on brackets 75 secured to the tractor frame.

When the stacker is lowered, the rack rests on skids 78 secured to the underside of the rear portion of the rack and secured to the rear end member 34. These skids 78 are so designed with respect to the point of securement of the booms 22 with the tractor frame, that when the rack is resting on the ground, the front ends of the teeth 32 are spaced a short distance off the ground. This relationship is shown in Figure 3 where the forward ends of the teeth are just off the ground. This distance, though, can be any convenient height desired. The object of this relationship is that the operator of the device need not be so careful as to control the operation to maintain the rack at just the proper height. The skids 78 are preferably of spring steel, to absorb the shock of the stacker when it comes to rest on the ground.

The operation of the device is simple. The stacker is lowered with the ejector retracted toward the rear, and bales are placed on the rack. The stacker is then lifted by means of the hydraulic rams 71 and the rams 68 are then extended, forcing the ejector 46 forward and pushing the bales off the stacker. Similarly, if loose hay is to be gathered, as for instance from a windrow, the stacker is lowered to the point shown in dotted lines in Figure 3, and the stacker driven forward, forcing the loose hay onto the stacker. The stacker is then lifted and the ejector forced forwardly in a similar manner forcing the hay into a vehicle. In this connection also, the skids 78 perform a useful function. In driving the stacker forward when gathering loose hay, the resiliency of the skids absorbs the shocks resulting from bumpy ground, resulting in a smoother travel of the stacker.

The hydraulic rams 71 are single acting since the stacker will lower under its own weight. However, the rams 68 are double acting, since the ejector 46 must be retracted by means of these rams.

The hydraulic motivating means is shown diagrammatically in Figure 2, and includes a motor 80, a tank 82 and an auxiliary tank 84. This hydraulic system need be only the conventional system supplied with farm tractors. A valve 86 is supplied in the system, upon operation of which, fluid is forced through the conduit 88 to the rams 71, whereby the pistons therein are extended and the stacker elevated. Upon reverse operation of the valve 86 to the position indicated by the dot-dash line 89 in Fig. 8, the fluid from the rams 71 bleeds through the conduit 90 back to the tank 84. The stacker thereby lowers under its own weight.

Another valve 91 is provided in the system for controlling the rams 68. Reference to Figure 9 will show the operation of this valve. The valve is a customary four-way valve, and in the position shown in this figure, the rams 68 will be extended. The conduit 92 from the pump 80 communicates with the conduit 94, which forces the fluid behind the piston in the rams 71, and at the same time the conduit 96 is in communication with the conduit 98, permitting the fluid from in front of the piston to return to the tank. When the arm 100 is returned to the position indicated by the dot-dash line 102, the action is reversed in the well known manner. This then enables the ejector to be positively operated in both directions by the rams 68. A pressure release valve 104 is interposed in a by-pass conduit 106 communicating between the pump 80 and the conduit 90 to provide for constant operation of the pump 80.

It will be seen that the operating mechanism 20 forms a parallelogram and is conveniently positioned on the tractor so as to take up very little space, and the stacker can be raised and lowered very conveniently. The stacker possesses considerable capacity, due to the range of extension of the ejector 46, which in turn is due to the length of the hydraulic rams 68. This is made possible by the special arrangement of the rams on the tractors. The arrangement eliminates complicated mechanical contrivances and results in a simple and compact mechanism.

Although I have herein shown and described a preferred embodiment of my invention, manifestly it is capable of modification and rearrangement of parts without departing from the spirit and scope thereof. I do not, therefore, wish to be understood as limiting this invention to the precise form herein disclosed, except as I may be so limited by the appended claims.

I claim as my invention:

1. In a hay buck and stacker for use with a tractor, the combination comprising a pair of booms pivoted on opposite sides of the tractor and extending forwardly therefrom, a rack secured to the forward ends of the booms, the rack being formed with a plurality of forwardly extending teeth disposed in spaced parallel relation and in a common plane, an ejector slidable on the rack, rollers mounted on the ejector, certain of the teeth being formed of strengthened material to provide supporting means for the ejector, the remainder of said teeth being of light weight material relative to the teeth forming the supporting means, said rollers adapted to engage and roll on said supporting means, hydraulic rams operable for sliding the ejector, the hydraulic rams being secured to the booms and movable therewith, and second hydraulic rams pivoted on the tractor for elevating the buck about the pivot points of the booms.

2. In a hay buck and stacker for use with a tractor, the combination comprising a pair of booms pivoted on the tractor and extending forwardly therefrom, a rack secured to the forward ends of the booms, the rack being formed with a plurality of forwardly extending teeth disposed in spaced parallel relation and in a common plane, an ejector mounted on the rack, certain of said teeth being formed to provide supporting tracks for said ejector, roller carriages mounted on the ejector and engaging said tracks whereby said ejector is slidable on said tracks, a shield mounted on said ejector in association with each roller carriage and extending in the direction toward the free ends of the teeth, said shields being associated with said tracks in the sliding action of said ejector.

3. A hay stacker rack comprising, in combination, a plurality of spaced parallel teeth disposed in a common plane, an end frame secured to one end of the teeth and forming a unitary rack therewith, and an ejector slidable on the rack, said ejector being engageable with and bearing on the teeth of the rack in its sliding movements, certain of said teeth being formed of tubular steel and providing bearing means for the ejector, the remainder of said teeth being of light weight material relative to said tubular steel, said ejector being adapted for connection with operating means for sliding the ejector.

4. A hay stacker rack comprising, in combination, a plurality of spaced parallel teeth disposed in a common plane, an end frame secured to one end of the teeth and forming a unitary rack therewith, an ejector mounted on said rack, certain of said teeth being formed of tubular steel and providing bearing means for the ejector, the remainder of said teeth being of light weight material relative to said tubular steel, and roller assemblies mounted on the ejector, the rollers of said roller assemblies being associated with said steel teeth whereby said ejector is slidable along the rack, said ejector being adapted for connection with operating means for sliding the ejector.

5. A hay stacker rack comprising, in combination, a plurality of spaced parallel teeth disposed in a common plane, an end frame secured to one end of the teeth and forming a unitary rack therewith, certain of said teeth being formed of tubular steel and providing bearing means for the ejector, roller assemblies mounted on the ejector, the rollers of said roller assemblies being engageable with said tubular steel teeth, whereby said ejector is slidable along the rack, and a shield mounted on the ejector individual to each tubular steel tooth, said shields extending in the direction of the free ends of the teeth and being associated with the tubular steel teeth in the sliding movements of the ejector.

6. In a hay buck and stacker for use with a tractor, the combination comprising, a pair of booms adapted to be pivoted on the tractor and extending forwardly therefrom, a rack rigidly secured to the forward ends of said booms, said rack having a plurality of spaced parallel teeth lying in a common plane and extending a substantial distance longitudinally forwardly from the forward ends of said booms, said booms and rack being swingable with said rack forming a rigid longitudinal extension of said booms in all positions of said booms and rack, an ejector slidable on the teeth of said rack in directions longitudinally of said rack and booms, and hydraulic rams rigidly secured to said booms and extending a substantial portion of the length of said booms, said rams being movable with said booms and being connected with said ejector and operable to slide said ejector along said rack.

ALBERT L. BRAUCH.

REFERENCES CITED

The following references are of record in the file of this patent:

UNITED STATES PATENTS

| Number | Name | Date |
| --- | --- | --- |
| 1,583,336 | Chial | May 4, 1926 |
| 1,653,739 | Sloane | Dec. 27, 1927 |
| 1,669,688 | Armstrong | May 15, 1928 |
| 2,295,917 | Schwan | Sept. 15, 1942 |
| 2,311,523 | Cope et al. | Feb. 16, 1943 |
| 2,319,921 | Dooley et al. | May 25, 1943 |
| 2,397,046 | Richey | Mar. 19, 1946 |
| 2,404,154 | Williams | July 16, 1946 |
| 2,409,302 | Millikin | Oct. 15, 1946 |